(12) United States Patent
Mochizuki et al.

(10) Patent No.: US 8,415,028 B2
(45) Date of Patent: Apr. 9, 2013

(54) CLAD SHEET AND METHOD OF PRODUCING SAME

(75) Inventors: Chitoshi Mochizuki, Yokohama (JP); Takashi Yoshida, Yokohama (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 12/597,270

(22) PCT Filed: Feb. 21, 2008

(86) PCT No.: PCT/JP2008/052952
§ 371 (c)(1),
(2), (4) Date: Oct. 23, 2009

(87) PCT Pub. No.: WO2008/132864
PCT Pub. Date: Nov. 6, 2008

(65) Prior Publication Data
US 2010/0136360 A1 Jun. 3, 2010

(30) Foreign Application Priority Data

Apr. 25, 2007 (JP) ................. 2007-115490

(51) Int. Cl.
- *B32B 15/04* (2006.01)
- *B32B 15/18* (2006.01)
- *B05D 1/00* (2006.01)
- *B05D 3/02* (2006.01)

(52) U.S. Cl.
USPC ........... 428/680; 428/685; 427/201; 427/375; 427/376.6; 427/383.7

(58) Field of Classification Search .................. 428/553, 428/548, 567, 680, 685
See application file for complete search history.

(56) References Cited

U.S. PATENT DOCUMENTS

| | | | |
|---|---|---|---|
| 5,874,178 A * | 2/1999 | Takayasu | 428/681 |
| 6,203,754 B1 | 3/2001 | Sugiyama | |
| 6,257,483 B1 | 7/2001 | Inaba | |
| 7,387,230 B2 | 6/2008 | Mochizuki et al. | |
| 2006/0163322 A1 * | 7/2006 | Mochizuki et al. | 228/101 |

FOREIGN PATENT DOCUMENTS

JP 9-225679 A 9/1997

(Continued)

OTHER PUBLICATIONS

Machine Translation, Mochizuki et al., JP 2005-186127, Jul. 2005.*

(Continued)

*Primary Examiner* — Michael La Villa
(74) *Attorney, Agent, or Firm* — Ostrolenk Faber LLP

(57) ABSTRACT

A method of producing a clad sheet formed by joining a clad layer at least containing nickel, chromium, silicon, and phosphorus to a base material made of a stainless steel or a nickel-based alloy. A step of forming the clad layer includes contact-bonding a mixed powder to the base material, wherein an alloy powder that contains at least one selected from chromium, silicon, and phosphorus as components, and a nickel powder that functions as a binder to have the alloy powder be contact bonded to the base material are mixed in the mixed powder.

9 Claims, 2 Drawing Sheets

FOREIGN PATENT DOCUMENTS

| | | |
|---|---|---|
| JP | 3017978 | 12/1999 |
| JP | 2000-218389 | 8/2000 |
| JP | 2000-218390 | 8/2000 |
| JP | 3168158 | 3/2001 |
| JP | 2001-150126 A | 6/2001 |
| JP | 2003-181685 A | 7/2003 |
| JP | 2004-025251 A | 1/2004 |
| JP | 2004-082218 | 3/2004 |
| JP | 2005-186127 A | 7/2005 |
| JP | 2006-297450 | 11/2006 |

OTHER PUBLICATIONS

Machine Translation, Mochizuki et al., JP 2004-025251, Jan. 2004.*
Machine Translation, Nagai et al., JP 09-225679, Sep. 1997.*
International search Report dated May 20, 2008, issued in corresponding international application No. PCT/JP2008/052952.

* cited by examiner ns/052952, filed Feb. 21, 2008,
CLAD SHEET AND METHOD OF PRODUCING SAME

CROSS REFERENCE TO RELATED APPLICATIONS

The present application is a 35 U.S.C. §371 National Phase conversion of PCT/JP2008/052952, filed Feb. 21, 2008, which claims benefit of Japanese Application No. 2007-115490, filed Apr. 25, 2007, the disclosure of which is incorporated herein by reference. The PCT International Application was published in the Japanese language.

TECHNICAL FIELD

The present invention relates to a clad sheet and method of producing the same, specifically relates to a clad sheet that includes a sheet-shaped base material made of stainless steel and a clad layer joined to the base material and a method of producing the same.

BACKGROUND ART

Conventionally, alloy powders such as described in Patent References 1 to 4 have been known as brazing materials having corrosion resistance. Such brazing materials are used in brazing on various occasions, for example, as a material for brazing metallic members to each other in an EGR cooler used in EGR (Exhaust Gas Recirculation) system.

In general, the above-described brazing material and adhesive (adhesive agent) that contains resin are arranged, for example, by coating, only to a portion to be brazed on the metallic member. Since the resin contained in the adhesive includes carbon component, the resin is carburized by heating and remains in the brazed portion, thereby reducing joint strength. Therefore, it has been necessary to perform a degreasing treatment so as to remove the resin before the braze joining process (vacuum heat treatment).

As a method of arranging brazing material without using an adhesive, amorphous brazing material sheet may be arranged to a portion to be brazed. In this case, a working process such as a cutting process or shaping process is required to have a shape of the brazing material sheet be fitted to the portion where the sheet is arranged. In addition, it is difficult to arrange the brazing material sheet to a three-dimensional curved surface of a bended portion or the like. Therefore, the brazing material sheet is applicable to a limited portion, occasionally constraining brazing processing of metallic members.

On the other hand, a rolling treatment is known to contact-bond a metal powder to a sheet shaped base material (see Patent References 5 to 7). In such a rolling treatment, it is possible to make the metal powder adhere to the base material without using an adhesive.

Patent Reference 1: Japanese Patent, No. 3168158.
Patent Reference 2: Japanese Patent, No. 3017978.
Patent Reference 3: Japanese Unexamined Patent Application, First Publication, No. 2000-218389.
Patent Reference 3: Japanese Unexamined Patent Application, First Publication, No. 2000-218390.
Patent Reference 5: Japanese Unexamined Patent Application, First Publication, No. 2004-25251.
Patent Reference 6: Japanese Unexamined Patent Application, First Publication, No. 2004-82218.
Patent Reference 7: Japanese Unexamined Patent Application, First Publication, No. 2005-186127.

DISCLOSURE OF INVENTION

Problems to be Solved by the Invention

If the alloy powder can be contact-bonded to the metal member by applying the above-described rolling treatment without using an adhesive, it becomes possible to omit a degreasing treatment before the braze-joining process or the process of working the brazing material sheet and arranging the sheet to the joint-portion. As a result, advantages such as shortening of the joining process and enhancing the degree of freedom in processability of metal members are achieved.

However, since the above-described corrosion-resistant brazing alloy powder is very hard, it has been difficult to adhere the powder to the metal member by using a rolling-roller to adhere the powder to the metal member. In general, since a powder made of an alloy is very hard, it has been difficult to adhere an alloy powder to a metal member by a conventional rolling-treatment.

The present invention was carried out based on the consideration of the above-described problems and an object of the present invention is to ensure contact-bonding of an alloy powder to a base material where an alloy powder having corrosion resistance or brazability is contact-bonded to a sheet-shaped base material (metal member).

In addition, the present invention provides a clad sheet which has corrosion resistance and brazability, and allows omitting of degreasing in the braze joining process, or omitting working and arrangement of the brazing sheet.

Solutions of the Problems

In order to achieve the above-described object, a method of producing a clad sheet according to the present invention is a method of producing a clad sheet formed by joining a clad layer containing at least nickel, chromium, silicon, and phosphorus to a sheet-shaped base material made of stainless steel or nickel-based alloy, wherein a step of forming the clad layer includes performing a contact-bonding step by powder roll compaction to contact-bond a mixed powder to the base material, where an alloy powder containing a component selected from at least one of chromium, silicon, and phosphorus, and a nickel powder that functions as a binder to contact-bond the alloy powder to the base material are mixed in the mixed powder.

According to a method of producing a clad sheet of the present invention having the above-described constitution, a mixed powder including an alloy powder containing at least one selected from chromium, silicon, and phosphorus as a component and a nickel powder contact-bonds to the base-material.

Chromium is effective for improving corrosion resistance of the clad sheet. Silicon and phosphorus are effective for improving brazability of the clad sheet. An alloy powder that contains at least one selected from chromium, silicon, and phosphorus has a corrosion resistance or brazability. Since the above-described alloy powder has a low ductility, the alloy powder is mixed with a nickel powder of high ductility and is contact-bonded to the base material utilizing nickel powder as a binder.

In the present invention, the clad layer containing at least one selected from chromium, silicon, and phosphorus includes a clad layer having an alloy phase containing one or plural species selected from chromium, silicon, and phosphorus, and a clad layer having pure metal phase of chromium, silicon, and phosphorus.

In the method of producing a clad sheet according to the present invention, it is possible to apply (adopt) a constitution of the above-described mixed powder in which the above-described nickel powder is contained in an amount of 10% by weight or more.

In the method of producing a clad sheet according to the present invention, it is possible to apply a constitution wherein a particle shape of the above-described nickel powder has a plurality of protrusions.

In the method of producing a clad sheet according to the present invention, it is possible to apply a constitution wherein the above-described mixed powder as a whole has a composition consisting of 13 to 18 weight % of chromium, 3 to 4 weight % of silicon, 4 to 7 weight % of phosphorus, and the balance consisting of nickel and unavoidable impurities.

In the method of producing a clad sheet according to the present invention, it is possible to apply a constitution wherein the process of forming a clad layer includes a heating step to heat the clad layer after the contact-bonding step to fuse a metal powder that is contained in a contact-bonded phase constituting the clad layer and has a low melting temperature, thereby forming the clad layer on the base material.

Where the above-described constitution is applied in the method of producing a clad sheet according to the present invention, it is possible to use a powder composition with a melting point of 900° C. or less, for example, BiNi-7, as the alloy-powder.

For example, where a clad layer is formed by melting (fusing) a BNi-7 powder at 900° C., the clad sheet has ductility because of a presence of a nickel phase. Therefore, it is easy to perform plastic working such as press-shaping of the clad sheet. Where the clad sheet three-dimensionally shaped by press-shaping or the like is subjected to a brazing treatment at a temperature of about 1000° C., composition of a sum of the alloy powder is made close to average composition of an alloy-phase constituting the clad layer, thereby achieving an effect of improving corrosion resistance.

Next, a clad sheet according to the present invention comprises a sheet-shaped base material made of stainless steel, and a clad layer (layers) fused to one surface or both (two) surfaces of the base material, wherein the clad layer includes an alloy phase containing nickel, chromium, silicon, and phosphorus, and a nickel phase.

According to the clad sheet of the present invention having the above-described constitution, the clad layer is constituted of two or more metal phases including a nickel phase and a metal phase containing at least one selected from nickel, chromium, silicon, and phosphorus, and the clad layer is fused and joined to the base material. Therefore, it is not necessary to use an adhesive that contains a carbon component as a resin. Chromium is a material which is effective for improving corrosion resistance of the clad sheet. Silicon and phosphorus are effective for reducing the melting point and improving brazability.

Therefore, the clad layer that includes an alloy phase containing nickel, chromium, silicon, and phosphorus has corrosion resistance or brazability. On the other hand, the nickel phase which is a metal phase composed of a pure metal nickel that has high ductility. Therefore, the clad layer that includes the nickel phase is excellent in processability.

In the clad sheet according to the present invention, it is possible to apply a constitution wherein the metal phase is composed of two or more metal phases.

Where the above-described constitution is applied, it is possible to select one of the metal phases from a metal having a melting temperature lower than that of the nickel phase, for example, a melting temperature of 1150° C. or less.

In the clad sheet according to the present invention, it is possible to apply a constitution wherein the clad layer as a whole body has a composition composed of 13 to 18 weight % of chromium, 3 to 4 weight % of silicon, 4 to 7 weight % of phosphorus, and the balance consisting of nickel and unavoidable impurities.

Effect of the Invention

According to the method of producing a clad sheet of the present invention, mixed powder is composed of an alloy powder that contains at least one material selected from chromium, silicon, and phosphorus as a component, and a nickel powder composed of a pure metal nickel having high ductility, and the mixed powder is contact-bonded to the base material. Therefore, the nickel powder functions as a binder, and the alloy powder is firmly adhered to the base material.

Therefore, according to a method of producing a clad sheet according to the present invention, it is possible to have an alloy powder firmly adhered to a base material in a case where an alloy powder having corrosion resistance or brazability is contact-bonded to a sheet-shaped base material.

According to the clad sheet of the present invention having the above-described constitution, a clad-layer having a nickel phase and an alloy phase containing nickel, chromium, silicon, and phosphorus is fused to the base material. That is, the clad sheet is joined to the base material without using an adhesive.

That is, the clad-sheet of the present invention has both corrosion resistance and brazability. Thus, a degreasing treatment in the braze-joining process and a process of working and arranging a brazing sheet can be omitted.

In addition, since the clad-layer includes a nickel phase having high ductility, the degree of freedom in processability of the clad sheet is improved compared to the case where the nickel phase is not included.

EXPLANATION OF SYMBOLS

1 . . . clad sheet, 2 . . . metal plate (base material), 3 . . . clad layer, F . . . mixed powder, F1 . . . alloy powder, F2 . . . nickel powder, F3 . . . silicon powder, F4 . . . BNi-7 powder, Y1 . . . alloy phase, Y2 . . . nickel phase, Y3 . . . alloy phase (a phase of lowest melting temperature).

BEST MODE FOR CARRYING OUT THE INVENTION

In the following, a clad sheet and an production method thereof according to the present invention are explained with reference to the drawings. In the below described drawings, contraction/magnification scale of each member is modified so as to show the member in a visual dimension.

Figure 1:
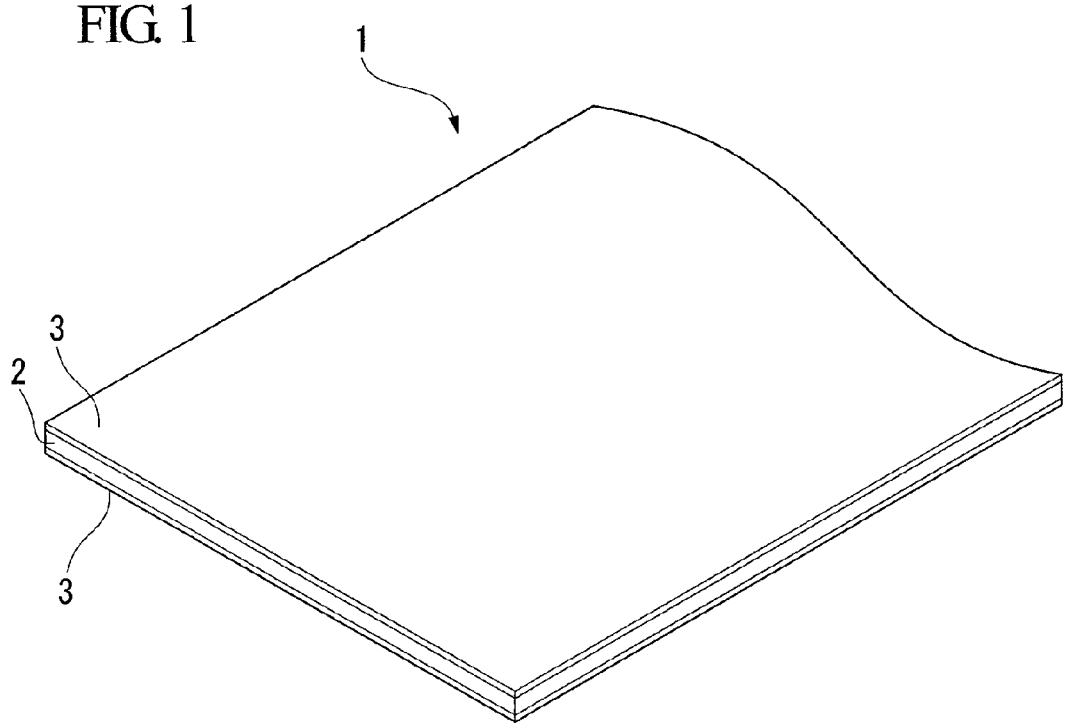
FIG. 1 is a perspective view of a clad sheet according to an embodiment of the present invention.
Figure 2:
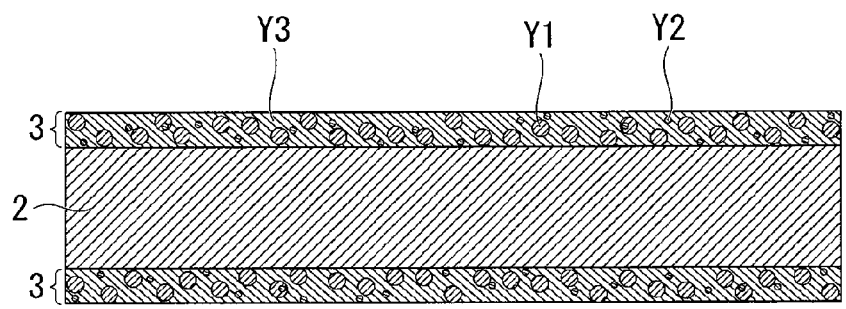
FIG. 2 is a magnified cross section of a clad sheet according to an embodiment of the present invention.

FIG. 1 is a schematic view of a clad sheet 1 according to an embodiment of the present invention. FIG. 2 is a magnified cross section of a clad sheer 1 of the present embodiment. As shown in the figure, the clad sheet 1 of the present embodiment comprises a metal plate 2 that constitutes a base material, and clad layers 3 contact-bonded to whole areas of both surfaces of the base material.

The metal plate 2 is made of SUS (stainless steel), and is preferably made of SUS304, SUS316, SUS410, or SUS444. The clad layer 3 comprises an alloy phase Y1 that includes nickel, chromium, silicon, and phosphorus, a nickel phase Y2, and an alloy phase Y3 (a phase having the lowest melting temperature) that has been solidified after fusion (melting) of BNi-7 (JIS standard: Z3265).

The clad layer 3 includes unavoidable impurities (not shown) as well as nickel, chromium, silicon, and phosphorus.

The alloy phase Y1 is a phase formed by partial melting of an alloy powder that includes chromium, silicon, and phosphorus as components, and the balance consisting of nickel.

Chromium is a material that is effective in improving corrosion resistance of the clad sheet 1. Silicon and phosphorus are materials that are effective in improving brazability of the clad sheet 1. Since the alloy phase Y1 including such chromium, silicon, and phosphorus as components exists in the clad layer 3, the clad sheet 1 of the present invention is provided with both of corrosion resistance and brazability.

Nickel phase Y2 is a phase formed by partial melting of a metal powder composed of a pure metal nickel having high ductility. By the presence of the phase composed of highly ductile pure metal of nickel in the clad layer 3, the clad sheet 1 according to the present embodiment has a high degree of freedom in processability, for example, in pressing or bending.

As described above, the alloy phase Y3 is formed by fusion of BNi-7 and is filled in the interstices of an alloy phase Y1 and a nickel phase Y2. A melting temperature of the alloy phase Y3 is the lowest compared to the alloy phase Y1 and the nickel phase Y2, and is preferably 1150° C. or less. By the melting of the alloy phase Y3, the metal plate 2 as the base material and the clad-layer 3 are fused to each other. That is, in the clad sheet 1 according to the present embodiment, the metal plate 2 and the clad layer 3 are joined without requiring an adhesive.

BNi-7 is a known nickel-based alloy specified in a JIS standard (Z3265: nickel brazing filler) and contains about 13 to 15 weight % of chromium, and 9.7 to 10.5 weight % of phosphorus.

As described above, the clad layer 3 includes the alloy phase Y1 formed by partial melting of an alloy powder containing chromium, silicon, phosphorus, and the balance consisting of nickel, and an alloy phase Y3 formed by melting of BNi-7 (alloy). That is, the clad layer 3 comprises two alloy phases having different compositions.

The composition of the clad layer 3 obtained by equalizing (averaging) the total clad layer 3 as a whole contains 13 weight % of chromium, 4 weight % of silicon, 6 weight % of phosphorus, and the balance consisting of nickel and unavoidable impurities.

In the thus constituted clad sheet 1 according to the present embodiment, 13 weight % of chromium is contained in the clad-layer 3. The clad layers 3 are formed on the entire area of two surfaces of the metal sheet 2. Therefore, the clad layers 3 exert corrosion resistance and prevent corrosion of the clad sheet 1.

The clad sheet 1 according to the present embodiment contains 4 weight % of silicon and 6 weight % of phosphorus in the clad layers 3. Therefore, the clad layers 3 have sufficient strength as a brazing material and enables brazing at a low temperature. That is, the clad layer 3 has excellent brazability.

The clad sheet 1 according to the present embodiment has both of corrosion resistance and brazability. Therefore, it is not necessary to arrange an additional brazing material sheet or the like. Thus, a treatment of working and arranging a brazing material sheet can be omitted.

In the clad sheet 1 according to the present embodiment, a nickel phase Y2 having high ductility exists in the clad layer 3. Therefore, the clad layer 3 of the present embodiment is softened compared to a clad layer in which the above-described nickel, chromium, silicon, phosphorus, and unavoidable impurities are homogeneously mixed in the same compositional ratios. Therefore, the clad sheet 1 of the present embodiment has a high degree of freedom in processability.

In the clad sheet 1 according to the present embodiment, the clad layer 3 is fused to the metal plate 2 that constitutes a metal plate 2. That is, the metal plate 2 and the clad layer 3 are joined without using an adhesive.

Therefore, it is possible to omit a degreasing treatment in the joining step during brazing the clad sheet 1 according to the present embodiment.

As described above, in the clad sheet 1 according to the present embodiment, the clad layers 3 are formed on the entire areas of the two surfaces of the metal plate 2. Therefore, the clad sheet as a whole has corrosion resistance. Conventionally, a brazing material or a brazing material sheet was arranged only to a braze-joint portion (portion to be brazed) of the metal plate. Therefore, the metal plate itself was made a thick plate so as to ensure corrosion resistance of a portion where the brazing material is not adhered or the brazing sheet is not formed. On the other hand, since the clad sheet 1 of the present embodiment has corrosion resistance as a total body, it is possible to reduce the thickness of the metal plate itself. Therefore, for example, it is possible to reduce the size and weight of an apparatus or the like manufactured using the clad sheet 1.

Next, a method of producing a clad sheet 1 is explained.

Figure 4:
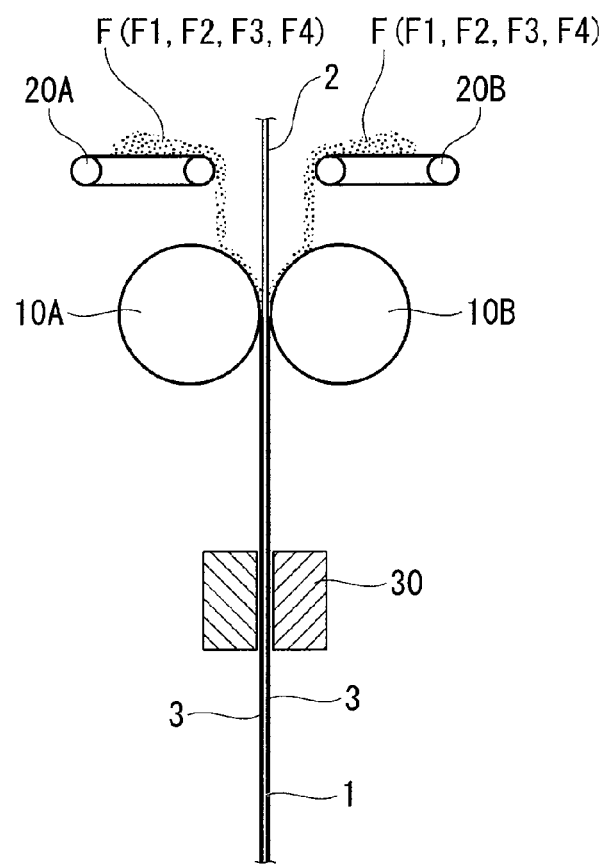
FIG. 4 is a schematic view showing a diagrammatic constitution of a production apparatus used in producing a clad sheet according to an embodiment of the present invention.

FIG. 4 is a schematic drawing showing a diagrammatic constitution of an apparatus of producing a clad sheet 1. As shown in the figure, the production apparatus comprises rolling rollers 10A, 10B, belt feeders 20A, 20B, and a heating furnace 30.

The rolling rollers 10A and 10B are arranged such that circumference surfaces thereof are in parallel and opposed to each other intervening a predetermined spacing therebetween, and the metal plate 2 is inserted from an upper direction to a lower direction in the space between the rollers 10A and 10B.

Belt feeders 20A and 20B are arranged above the rolling rollers 10A and 10B. The Belt feeder 20A is arranged above the rolling roller 10A and feed (supply) a mixed powder F on the circumference surface of the rolling roller 10A. The belt feeder 20B is disposed above the rolling roller 10B and feeds the mixed powder F on the circumference surface of the rolling roller 10B.

A heating furnace 30 is disposed below the rolling rollers 10A, 10B and heats the metal plate 2 delivered from the rolling rollers 10A and 10B at a temperature around a melting point of the below-described BNi-7 powder.

In the mixed powder F fed from the belt-feeders 20A, 20B to the rolling rollers 10A and 10B, alloy powder F1, nickel powder F2, silicon powder F3, and BNi-7 powder F4 are mixed.

The alloy powder F1 contains 29 weight % of chromium, 4 weight % of silicon, and 6 weight % of phosphorus as components, and the balance consisting of nickel. The alloy powder F1 is a powder of low ductility and is produced, for example, by a gas atomizing method. As described above, the alloy powder F1 contains chromium, silicon, and phosphorus as components.

Figure 3:
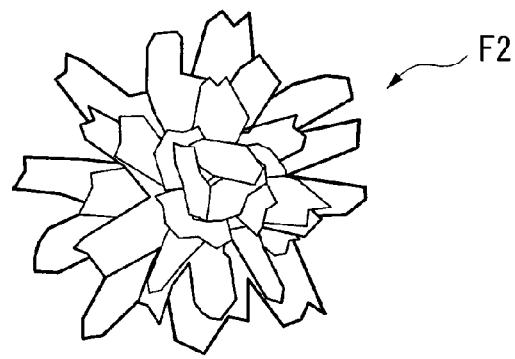
FIG. 3 is a schematic drawing for explaining a shape of a nickel powder particle.

The nickel powder F2 is a metal powder composed of nickel, a pure metal having high ductility, and functions as a binder to contact-bond the alloy powder F1 to the metal plate 2. As the nickel powder F2, it is preferable to use, for example, carbonyl nickel powder in which particles have a plurality of protrusions as shown in FIG. 3. By the use of the nickel powder F2 of such a particle shape, adhesion between the nickel powder F2 and the alloy powder F1 is improved by the protrusion portions. As a result, it is possible to firmly contact-bond the alloy powder F1 to the metal plate 2. Such a nickel powder F2 is contained in the mixed powder in an amount of 10 weight % or more.

Silicon powder F2 is a metal powder composed of silicon and is added in order to control the fractions of each component in the clad layer 3, that is, to increase the amount of silicon contained in the clad layer 3.

Composition of the sum of the mixed powder is identical to the composition of the total body of the above-described clad layer 3, and is composed of 13 weight % of chromium, 4 weight % of silicon, 6 weight % of phosphorus, and the balance being nickel and unavoidable impurities.

In the production apparatus constituted as explained above, the mixed powder F is fed from the belt-feeders 20A, 20B to the circumference surface of each of rolling rollers 10A and 10B. The mixed powder F fed to circumference surface of each of rolling rollers 10A and 10B is rolled (contact-bonded) to each surfaces of the metal plate 2 by further rotations of the rolling rollers 10A and 10B. That is, a contact-bonding step to contact-bond the mixed powder F to the metal plate 2 by the rolling rollers 10A and 10B is performed.

In the present embodiment, nickel powder F2 is contained in the mixed powder F. Therefore, the nickel powder F2 is deformed by being rolled by the rolling rollers 10A and 10B and functions as a binder for adhering the alloy powder F1 to the metal plate 2. Therefore, it is possible to contact-bond the alloy powder F1 containing chromium, silicon, and phosphorus as components to the metal plate 2 without using a conventional adhesive that includes a resin.

Next, the metal plate 2 contact-bonded with the mixed powder F on the entire areas of the both surfaces is heated in the heating furnace 30 at a temperature around a melting point of BNi-7 powder F4. By this heating, the BNi-7 powder F4 having the lowest melting temperature is molten.

By the melting of BNi-7 powder, the alloy powder F1 and nickel powder F2 are partially molten. The silicon powder F3 is molten accompanied to melting of the BNi-7 powder. By cooling after melting of each powders F1 to F4, clad layer 3 having alloy phase Y1, nickel phase Y2, and alloy phase Y3 is formed.

In the time of brazing, the clad sheet 1 is reheated (vacuum heat treatment) and homogenization of the clad layer constituted of plural metal phases proceeds.

By the above-described steps, the clad sheet 1 of the present embodiment as shown in FIG. 1 and FIG. 2 is produced.

According to the above-described production method of a clad sheet 1, the mixed powder F mixing the alloy powder F1 and the nickel powder F2 is contact-bonded to the metal plate 2, where the alloy powder F1 exhibits corrosion resistance and brazability, and the nickel powder F2 exhibits ductility and adhesion. Therefore, in the case of contact-bonding the alloy powder F1 having corrosion resistance and brazability to the metal plate 2, it is possible to firmly adhere the alloy powder F1 to the metal plate 2.

According to the production method of a clad sheet 1 of the present embodiment, the nickel powder F2 is contained in the mixed powder F in an amount of 10 weight % or more. In such a case, the alloy powder F1 is adhered to the metal plate 2 satisfactorily. Therefore, according to the method of producing a clad sheet 1 according to the present embodiment, it is possible to satisfactorily adhere the alloy powder F1 to the metal plate 2.

According to a production method of a clad sheet 1, the nickel powder F2 is, for example, carbonyl Ni powder having plural protrusions. Therefore, adhesion between the nickel powder F2 and the alloy powder F1 is improved by the protrusion portions, and it is possible to adhere the alloy powder F1 to the metal plate 2 more firmly. By the thus firm bonding of the alloy powder F1 to the metal plate 2, it is possible to suppress delamination of the mixed powder F from the metal plate 2.

In the method of producing a clad sheet 1 according to the present embodiment, clad layer 3 is formed by melting of the BNi-7 powder F4. The BNi-7 powder has a low melting point of about 900° C. Therefore, it is possible to reduce the heating temperature to be about 900° C., thereby suppressing oxidization of chromium and silicon.

In the above-described production method of a clad sheet, a clad layer is formed by only melting a powder (BNi-7 powder F4) of low melting temperature. Therefore, the nickel phase is dispersed in the clad layer. As a result, the clad layer of the clad sheet 1 produced by the production method according to the present embodiment has ductility, and the clad sheet can be subjected to plastic working such as press working and bending. Thus, it is possible to shape the clad sheet 1 to a complex three dimensional shape while avoiding delamination or dropping of the clad layer.

According to the clad sheet 1 of the present embodiment produced by the production method, heterogeneity in composition of the clad-layer (composition is not homogeneous because of disperse nickel phase) is erased and the composition is homogenized. As a result, the fraction of existent nickel phase is reduced, alloying proceeds, and corrosion resistance is improved. In addition, by the reduction of the fraction of the nickel phase, ductility is reduced, but the strength is enhanced.

In the above-description, preferred embodiments of a clad sheet and method of producing the same were explained with reference to the drawings. However, the present invention is not limited to the above-described embodiment. Shapes and the combination of constituent members shown in the above-described embodiment are exemplary and can be modified in various ways in accordance with different designs or the like provided that the modification is within the scope of the present invention.

For example, in the above-explained embodiment, the composition of the clad layer 3 and the mixed powder contains 13 weight % of chromium, 4 weight % of silicon, 6 weight % of phosphorus, and the balance consisting of nickel. However, the present invention is not limited to this composition.

For example, with regard to chromium, if the clad layer 3 and the mixed powder F contained 13 to 18 weight % of chromium, the clad layer 3 exhibits specifically satisfactory corrosion resistance. In addition, the clad layer 3 exhibits specifically satisfactory brazability, if the clad layer 3 and the mixed powder F contain 3 to 4 weight % of silicon, or if the clad layer 3 and the mixed powder F contain 4 to 7 weight % of phosphorus. Therefore, the composition can be modified to arbitrary composition in which the fraction of each component is within the above-described range. For example, it is possible to constitute the mixed powder F of 20 weight % of alloy powder F1, 30 weight % of nickel powder F2, silicon powder F3, 40 weight % of BNi-7 powder F4, and 7 weight % of chromium powder. In this case, composition of the clad layer 3 and the mixed powder F is composed of 19 weight % of chromium, 5 weight % of silicon, 5 weight % of phosphorus, and the balance consisting of nickel. Also in this case, it is possible to achieve effects like the clad sheet 1 and method of producing the same according to the above-described embodiment.

While the mixed powder F was composed by mixing three powders in the above-described embodiment, the present invention is not limited to this constitution. For example, it is possible to use a mixed powder composed by mixing two species of powders.

In such a case, the mixed powder of a predetermined composition may be formed by mixing a nickel powder and a metal powder (for example, BNi-7 powder having a melting temperature of 900° C. or less) having a melting temperature of 1150° C. or less.

In the above-describe embodiment, since the powder of the lowest melting temperature contained in the mixed powder was the BNi-7 powder F4, the heating temperature in the heating furnace 30 was adjusted to the melting point of the BNi-7 powder F4. However, where the mixed powder includes a powder with a further low melting point, the heating temperature in the heating furnace 30 is adjusted in accordance with the powder of the lowest melting point.

In the above-explained embodiment, the clad layers 3 were formed on both surfaces of the metal plate 2. However, the present invention is not limited to this constitution, and a clad layer 3 may be formed on only one surface of the metal plate 2.

In the production apparatus of the above-described embodiment, mixed powder F was fed to the rolling rollers 10A and 10B using the belt-feeders 20A and 20B. However, the present invention is not limited to this constitution, and any constitution is allowable provided that a certain amount of mixed powder F can be fed to the rolling rollers 10A and 10B. For example, a screw feeder or a roll feeder may be used as an alternative to the belt feeder.

What is claimed is:

1. A method of producing a clad sheet formed by joining a clad layer containing nickel, chromium, silicon, and phosphorus to a base material made of a stainless steel or a nickel-based alloy, comprising:

performing contact-bonding a mixed powder to the base material, the mixed powder including a powder of an alloy and a nickel powder; and heating the base material bonded with the mixed powder, wherein the powder of an alloy is comprised of an alloy that contains nickel, chromium, silicon, and phosphorus as components, and the nickel powder functions as a binder to contact-bond the powder of the alloy to the base material, wherein the nickel powder is a carbonyl Ni powder composed of pure nickel which has a particle shape having a plurality of protrusions, and the powder of the alloy is partially molten by the heating.

2. The method of producing a clad sheet according to claim 1, wherein the mixed powder contains 10 weight % or more of the nickel powder.

3. The method of producing a clad sheet according to claim 1, wherein a composition of a sum of the mixed powder is composed of 13 to 18 weight % of chromium, 3 to 4 weight % of silicon, 4 to 7 weight % of phosphorus, and the balance being nickel and unavoidable impurities.

4. The method of producing a clad sheet according to claim 1, wherein the mixed powder further includes silicon powder.

5. The method of producing a clad sheet according to claim 1, wherein the mixed powder further includes a phosphorous powder.

6. The method of producing a clad sheet according to claim 1, wherein the mixed powder further includes chromium powder.

7. The method of producing a clad sheet according to claim 1, wherein the mixed powder includes powder of BNi-7 and the powder of BNi-7 is molten by the heating.

8. A clad sheet comprising:

a sheet-shaped base material that is made of a stainless steel or a nickel based alloy and that has a first surface and a second surface; and a clad layer that is fused to the first surface and/or the second surface of the base material, wherein the clad layer has an alloy phase and a nickel phase dispersed in the alloy phase, and the alloy phase includes an alloy that contains nickel, chromium, silicon, and phosphorous, and an alloy formed by melting and solidification of BNi-7, wherein the alloy formed by melting and solidification of BNi-7 has a melting temperature lower than the melting temperature of the nickel phase and the melting temperature of the alloy phase.

9. The clad sheet according to claim 8, wherein the clad layer as a whole body has a composition composed of 13 to 18 weight % of chromium, 3 to 4 weight % of silicon, 4 to 7 weight % of phosphorus, and the balance being nickel and unavoidable impurities.

* * * * *

UNITED STATES PATENT AND TRADEMARK OFFICE
CERTIFICATE OF CORRECTION

PATENT NO. : 8,415,028 B2  Page 1 of 1
APPLICATION NO. : 12/597270
DATED : April 9, 2013
INVENTOR(S) : Mochizuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this
First Day of September, 2015

Michelle K. Lee
*Director of the United States Patent and Trademark Office*